Patented Jan. 30, 1945

2,368,302

UNITED STATES PATENT OFFICE 2,368,302

DYE INTERMEDIATES COMPRISING BIS-ACYLACET AMIDES AND THEIR PREPARATION

Andrew B. Jennings, New Brunswick, N. J., assignor, by mesne assignments, to E. I. du Pont de Nemours & Company, Wilmington, Del., a corporation of Delaware No Drawing. Application December 12, 1941, Serial No. 422,778

12 Claims. (Cl. 260—247)

This invention relates to new organic compounds. More particularly it relates to novel dye intermediates. Still more particularly it relates to dye intermediates which contain two amide nuclei which are bridged by an alkylidene radical or a mono- or di-substituted alkylidene radical and the preparation of the same. Still more particularly the invention relates to dye intermediates which contain two carboxylic acylacet amide linkages which are bridged at the active methylene carbon atoms through an alkylidene including a substituted alkylidene radical.

This invention is a continuation-in-part of my copending application, Ser. No. 256,201, filed February 13, 1939, which is concerned with process of color photography and photographic compositions and elements therefor which utilize the novel dye intermediates hereof.

An object of this invention is to provide a new class of organic compounds. Another object is to provied a new class of dimeric amides which contain acyclic active methinyl groups which are bridged by an alkylidene radical or a substituted alkylidene radical. A further object is to provide novel polymeric dye intermediates from such dimeric compounds. Still other objects are to provide a general advance in the art.

The above and other objects are accomplished by the preparation of dye intermediates which contain two carboxylic acylacetamide linkages which are bridged through the active methylene carbon atoms through an alkylidene or substituted alkylidene radical. The majority of bis- or dimeric amide compounds obtainable by the invention have the general formula:

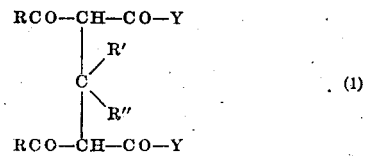

(1)

wherein RCO— is an acyl radical; R' is hydrogen or a hydrocarbon radical including substituted hydrocarbon radicals containing substituents which preferably are incapable of azo-coupling; R" has the same significance as R' but need not be the same in every instance and Y is an amine radical which is attached through the nitrogen atom thereof to the carbonyl group —CO— to form an amide linkage. R' and R" when hydrocarbon radicals may be alkyl including normal-, iso-, secondary-, and branched chain-alkyl, e. g. methyl, ethyl, isopropyl 2-methyl hexyl, isobutyl, hexyl, octyl, nonyl, decyl, undecyl, dodecyl, etc.; cycloalkyl, e. g. cyclohexyl, methylcyclohexyl, dodecylcyclohexyl, chlorocyclohexyl, aralkyl e. g. benzyl, menaphthyl, etc. aryl, e. g. phenyl, chlorophenyl, naphthyl, chlornaphthyl, etc.

The dye intermediates of this invention may be prepared by reacting two mols of the acylacetamide dye component with one mol of an aldehyde or ketone. As examples of suitable agents mention is made of formaldehyde, acetaldehyde, propionaldehyde, acrolein, glyoxal, benzaldehyde, salicylaldehyde, p-hydroxybenzaldehyde, furfural, acetone, acetophenone, etc. In certain cases compounds containing active halogen atoms may be used in place of formaldehyde. Such compounds include chloroform, sulfur dichloride and phosphorus oxychloride. Dimethylol derivatives of phenols, amides, amines, etc., e. g. dimethyl urea, dimethylolguanidine, 2,6-dimethylol-4-methylphenol also have utility. When such compounds are used an alkylidene linkage is placed between the dye-component groups. By alkylidene is meant not only the hydrocarbon radicals, but the halogen, hydroxy carboxylic and sulfonic acidic alkylidine radicals. The latter radicals may be introduced by using aldehydes or ketones containing such groups. Suitable aldehydes include o- and p-chloroacetaldehyde, o- and p-bromoacetaldehyde, phthalaldehydic acid, glyoxylic acid, benzaldehyde-o-sulfonic acid, salicyl aldehyde, and p-hydroxy benzaldehyde.

The reaction may be carried over a fairly wide range of temperature for instance from about room temperature to 250° C. and higher. When the condensation reaction is effected in the presence of a solvent or diluent such as water, alcohols, e. g. methanol, ethanol, etc., ethers, e. g. diethyl ether, dioxane, etc. or hydrocarbon e. g. benzene, toluene or xylene etc., a temperature up to the boiling point of the solvent may be used.

The condensation reaction may be carried out under neutral conditions, in an acid environment produced, for instance, by the addition of acid condensing agents, e. g. hydrochloric, sulfuric, or toluene sulfonic acid, or using alkaline condensing agents wherein the proper degree of alkalinity can be obtained by the addition of inorganic bases, e. g. sodium or potassium hydroxide; organic bases, e. g. piperidine, pyridine, trimethylamine, tri-N-propylamine, triethanolamine, tetramethylammonium hydroxide, etc. Readily hydrolyzable salts such as sodium acetate or ammonium chloride also have utility as condensing agents.

It has been found that the conditions under which the condensation is effected has a decided effect on the nature of product formed when formaldehyde and acylacetamides of aliphatic monocarboxylic acids are used. If acid conditions are used, a non-cyclic compound corresponding to generic Formula 1 is formed. If alkaline conditions are used a cyclic condensation product is formed having the general formula:

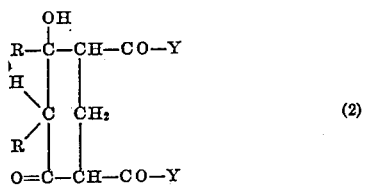

wherein R is the alkyl radical corresponding to the aliphatic acyl radical RCO— and Y is an amine radical which is attached through an amino nitrogen atom thereof to the carbonyl group (—CO—).

In the above formulae Y may be the amine radical corresponding to the following amines:

p-Aminophenyl morpholine
p-Anisidine
p-Phenetidine
p-Chloro-aniline
Alpha naphthylamine
Beta-naphthylamine
p-Aminophenyl piperidine
p-Amino dimethyl aniline
Benzoyl-p-phenylenediamine
N-ethyl-N-benzyl-p-phenylenediamine
N-ethyl-N-phenyl-p-phenylenediamine
2,5-dimethyl aniline
4-chloro-2,5-dimethyl aniline
2,3,5,6-tetramethyl aniline
2-chloro-5-methyl aniline
m-Toluidine
3-bromo-4-methyl aniline
3-nitro-4-methyl aniline
2,5-diethoxy-4-chloro-aniline
2,5-dimethoxy-4-chloro-aniline
2,5-diethoxy-4-furoylamino aniline
3-benzoylamino-4-methoxy aniline
4-benzoylamino-3-methoxy aniline
5-bromo-2-methoxy aniline
o-Phenoxy aniline
2,5-diethoxy-4-nitro aniline
Toluidine
Benzidine
Dianisidine
4-acetoacetamino-4-amino-diphenyl
Hexamethylene diamine
Decamethylenediamine
m-Nitro aniline
p-Nitro aniline
p-Phenoxy aniline
o-Chloro aniline
p-Aminophenyl-benzyl ether
4-chloro-2-methoxy-5-isopropyl aniline
p-Fluoro-aniline
2-nitro-4,6-dimethyl aniline
p-Amino benzoyl-2-amino benzothiazole
2-methoxy-4-nitro aniline
p-Amino-p'-hydroxy-azobenzene
Benzylamine Furthermore, RCO of Formula 1 may be the carboxylic acyl radical of any organic carboxylic acid and is preferably free from azo coupling groups. RCO, for example, may be an acyl radical corresponding to that present in aliphatic, cycloaliphatic, aromatic and heterocyclic monocarboxylic acids. Representative radicals falling within this group are saturated aliphatic acyl radicals of 2 to 18 carbon atoms, e. g. acetyl, propionyl, butyroyl, decanoyl, etc.; benzoyl, 4-chlorobenzoyl, 4-nitrobenzoyl; alpha-naphthoyl, etc.; furoyl, thienoyl, N-heterocyclic acyl, e. g. picolionoyl, nicotinoyl, isonicotinoyl, etc. abietoyl, tetrahydro-abietoyl, naphthenoyl, etc.

The invention will be further illustrated but is not intended to be limited by the following examples:

EXAMPLE I

*Methylene bis-acetoacetanilide*

About two mols of acetoacetanilide was treated with one mol of formaldehyde in the presence of a small amount of concentrated hydrochloric acid at a temperature of 100° in water. The pure white crystalline product (crystallized from alcohol) melted at 191° and apparently has the structure:

(I) 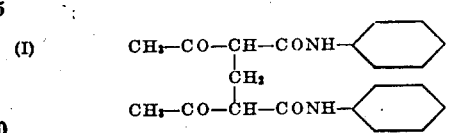

If the reaction is carried out by substituting a small amount of aqueous sodium hydroxide, a compound of the following formula is obtained (II) 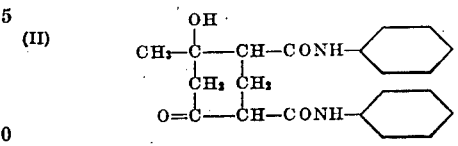

If piperidine is used as a condensing agent in the original reaction, a compound of Formula II is also formed.

EXAMPLE II

*Methylene bis-benzoylacetanilide*

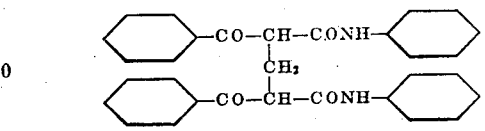

Benzoylacetanilide (M. P. 107–109°) (4.76 grams) is worked into a smooth paste with 10 cc. of alcohol and 0.75 cc. of 37% formaldehyde is added followed by the addition of 0.3 cc. of piperidine. The paste thins out, heat is evolved and the mixture soon thickens again and finally solidifies. After a short time, alcohol is added and the solid is broken up and filtered. After digesting several hours with alcohol, the pure white crystalline solid is filtered and washed with cold alcohol, M. P. 205°. The compounds probably has the structure given above.

EXAMPLE III

*Methylene bis-(benzoylacet-2-amino-6-methyl benzothiazole)*

This compound is prepared as in Example I by employing benzoylacet - 2 - amino - 6 - methyl benzothiazole (M. P. 225–226°) in place of the specific amide of that example. The pure white product, crystallized from alcohol, melts at 170–172° and is of the following probable structure:

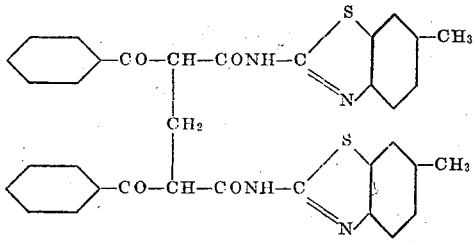

The same product is formed when sodium hydroxide is used as a condensing agent in place of the hydrochloric acid.

EXAMPLE IV

*Methylene bis-furoylacetanilide*

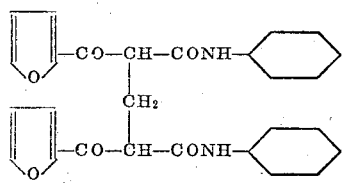

The compound is prepared exactly as in Example I, the starting material being furoylacetanilide, Jennings and Middleton, Serial No. 215,702 (M. P. 105°). The product is worked up and purified as in the previous example. The structure is probably that indicated above. The pure white crystalline material melts at 218–220°.

EXAMPLE V

*Isopropylidene-bis-acetoacetanilide*

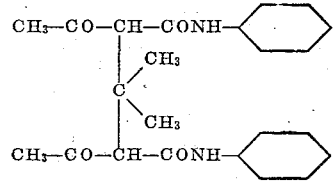

A suspension of 35.4 grams of acetoacetanilide in 100 cc. of absolute alcohol was treated dropwise at 5° C. with a solution of 4.6 grams of sodium in 150 cc. of absolute alcohol. To the clear solution, 113 gms. of 2,2′-dichloropropane were added, keeping the temperature below 10°. After stirring for one hour at room temperature, the solution was refluxed for one hour after which most of the alcohol was distilled off. Salt was removed by filtration and the filtrate diluted with ether. The white crystalline solid which separates after standing was removed, taken up in alcohol and reprecipitated with ether. After washing with ether and drying, the product melted at 203–204° C.

EXAMPLE VI

Twenty six and 6/10 grams of aceto-acet-p-amino-phenyl morpholine is dissolved in 100 cc. of alcohol to which has been added 10 cc. of concentrated HCl. The resulting solution is then treated with 1.08 grams of 37% formalin. The resulting solution is then heated with stirring on a hot plate to about 100°, after which it is chilled and the product recrystallized several times from alcohol. It is thought to have the following probable formula:

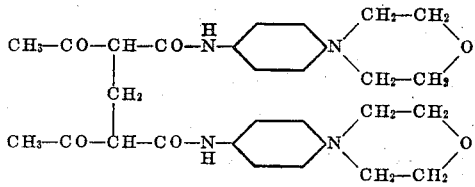

EXAMPLE VII

Two mols of aceto-acet 2,4-dichloroanilide are reacted in the presence of HCl with approximately 1 mol of formaldehyde as described in Example I. The product is thought to have the following formula:

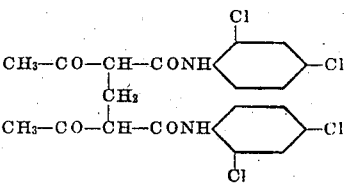

EXAMPLE VIII

Approximately 2 mols of benzoyl acet-p-aminophenyl morpholine are reacted with approximately 1 mol of formaldehyde in the presence of piperidine in a manner similar to that described in Example II. The product is thought to have the following formula:

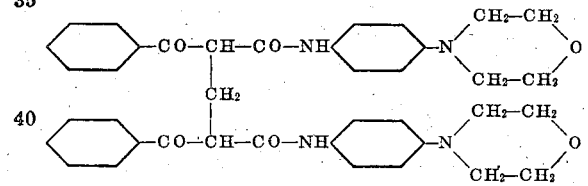

EXAMPLE IX

Four and 96/100 grams of aceto acet-amino-6-methyl benzothiazole are mixed with .75 cc. of 37% formalin, 10 cc. of H₂O and 2 cc. of concentrated HCl. The resulting mixture is heated on a hot plate with stirring. An additional 5 cc. of concentrated hydrochloride acid are added and the volume maintained by the addition of small quantities of water. After several hours the mixture is heated to boiling, cooled and then made slightly alkaline with ammonium hydroxide. The precipitate is filtered off, washed with water, treated with boiling alcohol and then with cold alcohol to remove final traces of impurities. The melting point of the final product is apparently 235°. It has the following formula:

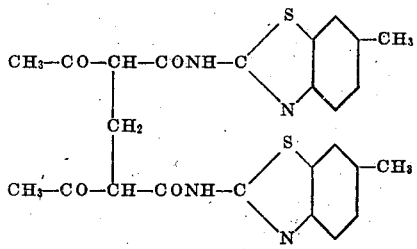

EXAMPLE X

Approximately 2 mols of N-furoylacet-N′-stearoyl benzidine are reacted with approximately one mol of formaldehyde in the presence of piperidine in the same manner as described in Example II.

The product is believed to have the following formula:

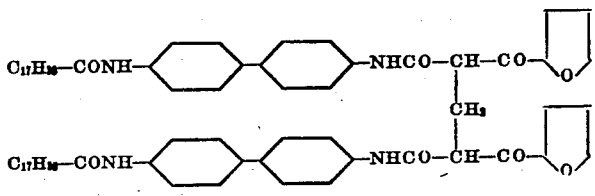

Example XI

A solution of the compound prepared in Example IV is treated with a solution of diazotized naphthonic acid. An orange dyestuff results.

Example XII

The compound prepared in Example III is dissolved in alcohol and treated with a solution of tetrazotized dianisidine. An orange-red dye is formed.

Example XIII

The product of Formula I prepared in Example I is dissolved in alcohol and mixed with an equal quantity of paraphenylene diamine. The mixture was then oxidized by treatment with a solution of chromic acid. A strong yellow azo methine dye was formed.

Example XIV

Approximately 2 mols of diacetoacetbenzidine are reacted with approximately 2 mols of formaldehyde in the presence of hydrochloric acid as described in Example II. A dye intermediate is formed having the following possible formula:

In place of the above amide components can be substituted any of the herein disclosed amides in like manner. The monamide components can be prepared from the ethyl ester of the desired acylacetic acid and the desired amine having a reactive hydrogen attached to the nitrogen atom by reacting the same in the liquid phase with the aid of inorganic solvents or diluents if necessary. The preparation of the monomeric acy-1-acetamides is well known and since it forms no part of this invention requires no further explanation. Among the additional suitable specific acylacet amides which can be substituted for those mentioned in the above examples are:

α-bromoacetoacetanilide
Acetoacet-p-bromanilide
Acetoacet-2-chloranilide
Acetoacet-2,4-dichloroanilide
Acetoacet-2,5-dichloroanilide
Acetoacet-m-nitroanilide
o-Methoxy acetoacetanilide
p-Hydroxy acetoacetanilide
Acetoacet-p-anisidide
Acetoacet-2-bromo-p-phenetidide
Acetoacet-p-aminoanilide
Acetoacet-o-dimethylaminoanilide
1,4-di(acetoacetamino)benzene
Sodium acetoacetanilide-p-sulfonate
4-acetoacetamideobenzophenone
Acetoacetyl-β-naphthylamine
Sodium acetoacet-2-naphthylamine-7-sulfonate
p-Phenylazo acetoacetanilide
2-acetoacetamino anthraquinone
1-acetoacetamino benzimidazole
2-acetoacetamino-4-methyl thiazole
2-acetoacetamino-4-phenyl thiazole
2-aceto-acetamino-4-methyl-5-carbethoxy thiazole
2-acetoacetamino-4-(1-coumaronyl)-thiazole The novel dimeric acetylacetamides of Formula 1 can be converted into higher molecular weight products if desired by reacting them with esterifying agents or amidating agents if desired. Thus, the acyl halides of long chain aliphatic carboxylic acids of 8 to 18 carbon atoms may be used. The bis compounds can be further reacted with aldehydes to form higher polymers if desired.

The novel dye intermediates have considerable utility in the art and can be used in dyeing textiles especially cellulose derivatives, coloring plastic materials, etc.

As many apparently widely different embodiments of this invention may be made without departing from the spirit and scope thereof, it is to be understood that I do not limit myself to the invention described herein except as defined in the appended claims.

I claim:

1. An amide containing at least one nuclei of the formula:

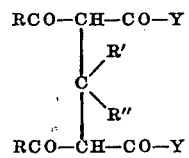

wherein RCO is an acyl radical, R' and R'' are members of the group consisting of hydrogen and hydrocarbon radicals and Y is an amine radical.

2. An alkylidine bis acylacetamide of the formula:

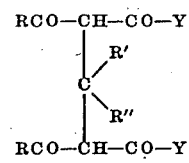

wherein RCO is an acyl radical, R' and R'' are members of the group consisting of hydrogen and hydrocarbon radicals and Y is an amine radical.

3. An alkylidine bis acylacetamide of the general formula:

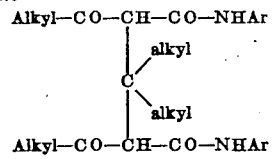

wherein Ar is an aromatic hydrocarbon nuclei joined to the nitrogen atom through an intracyclic carbon atom.

4. An alkylidine bis acylacetamide of the general formula:

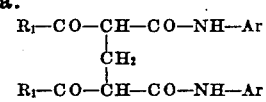

wherein $R_1CO$ is a heterocyclic acyl radical and

Ar is an aromatic hydrocarbon nuclei joined to the nitrogen atom through an intracyclic carbon atom.

5. An alkylidine bis acylacetamide of the general formula:

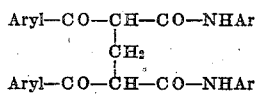

wherein Ar is an aromatic hydrocarbon nuclei joined to the nitrogen atom through an intracyclic carbon atom.

6. The process which comprises reacting two mols of an carboxylic acylacetamide of an organic amine with one mol of a compound taken from the group consisting of aldehydes and ketones.

7. A dimeric condensation product of two mols of a carboxylic acyl acetamide of an organic amine with one mol of a compound taken from the group consisting of aldehydes and ketones, said product being a bis-acyl acetamide wherein the acyl acetamide nuclei are bridged through the active methylene carbon atoms through an alkylidene radical.

8. A dimeric condensation product of two mols of an aliphatic carboxylic acyl acetamide of an organic amine with one mol of a compound taken from the group consisting of aldehydes and ketones, said product being a bis-acyl acetamide wherein the acyl acetamide nuclei are bridged through the active methylene carbon atoms through an alkylidene radical.

9. A dimeric condensation product of two mols of a carboxylic acyl acetamide of an organic amine with one mol of an aliphatic compound taken from the group consisting of aliphatic aldehydes and ketones, said product being a bis-acyl acetamide wherein the acyl acetamide nuclei are bridged through the active methylene carbon atoms through an alkylidene radical.

10. As a new compound methylene-bis-acetoacet-anilide.

11. Methylene bis - benzoylacetanilide having the following formula

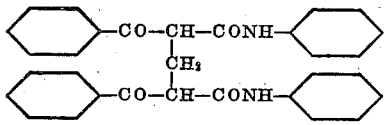

and a melting point of 205° C. in the form of white crystals.

12. Methylene bis-furoylacetanilide having the following formula

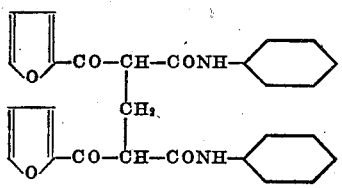

and a melting point of 218°–220° C. in the form of white crystals.

ANDREW B. JENNINGS.

CERTIFICATE OF CORRECTION.

Patent No. 2,368,302.   January 30, 1945.

ANDREW B. JENNINGS.

It is hereby certified that error appears in the printed specification of the above numbered patent requiring correction as follows: Page 1, first column, line 22, for "provied" read --provide--; page 3, first column, line 58, Example V. for the numeral "113" read --11.3--; and that the said Letters Patent should be read with this correction therein that the same may conform to the record of the case in the Patent Office.

Signed and sealed this 19th day of June, A. D. 1945.

(Seal)
Leslie Frazer
Acting Commissioner of Patents.